United States Patent
Nishino

[19]

[11] Patent Number: 6,139,466
[45] Date of Patent: Oct. 31, 2000

[54] TORQUE CONVERTER LOCK-UP CONTROL FOR AUTOMATIC TRANSMISSION HAVING MANUAL MODE

[75] Inventor: Kenji Nishino, Kanagawa, Japan

[73] Assignee: Nissan Motor Co., Ltd., Yokohama, Japan

[21] Appl. No.: 09/288,640

[22] Filed: Apr. 9, 1999

[30] Foreign Application Priority Data

Apr. 9, 1998 [JP] Japan ................................. 10-097321

[51] Int. Cl.$^7$ ..................................................... F16H 61/14
[52] U.S. Cl. ............................. 477/65; 477/169; 477/175
[58] Field of Search ............................... 477/62–64, 168, 477/169, 174, 175, 65; 192/3.63

[56] References Cited

U.S. PATENT DOCUMENTS

| | | | |
|---|---|---|---|
| 4,495,576 | 1/1985 | Ito | 477/63 X |
| 4,680,992 | 7/1987 | Hayasaki et al. | 74/869 |
| 4,811,827 | 3/1989 | Ishikawa et al. | 477/63 |
| 5,505,670 | 4/1996 | Inuzaka et al. | 477/63 X |
| 5,683,327 | 11/1997 | Inuzaka et al. | 477/174 X |

FOREIGN PATENT DOCUMENTS

| | | |
|---|---|---|
| 62-159839 | 7/1987 | Japan . |
| 7-229558 | 8/1995 | Japan . |
| 8-210492 | 8/1996 | Japan . |

OTHER PUBLICATIONS

"Nissan Full–Range Electronically Controlled Automatic Transmission of the RE4R01A Type", Mar. 1987; pp. I–24 through I–30.

*Primary Examiner*—Charles A Marmor
*Assistant Examiner*—Ankur Parekh
*Attorney, Agent, or Firm*—Foley & Lardner

[57] ABSTRACT

A torque converter lock-up clutch controlling system for a vehicle drive train inputs a vehicle speed signal and an engine load signal. The vehicle drive train includes an automatic transmission operable in a manual ("M") ratio change mode when an operator selects a "M" range position. The system enables the automatic transmission to behave like a manual transmission upon selection of the "M" range position. A memory includes a "M" range lock-up shift point map for storing data which relates the lock-up application and release to the vehicle speed and engine load signals. The "M" range lock-up shift point map includes lock-up application values, which correspond to the magnitudes of the vehicle speed signal at which lock-up clutch applications are to occur. The magnitudes of the vehicle speed signal at which lock-up clutch applications are to occur are determined in a manner as a function of the magnitudes of the engine load signal. The "M" range lock-up shift point map includes a lock-up release value which corresponds to the magnitude of the vehicle speed signal at which lock-up clutch releases are to occur regardless of the magnitudes of the engine load signal. A controller receiving the vehicle speed and engine load signals, retrieves data from the "M" range lock-up shift point map and processes the retrieved data to produce a lock-up signal. A lock-up actuator controls the toque converter lock-up clutch in response to the lock-up signal.

4 Claims, 6 Drawing Sheets

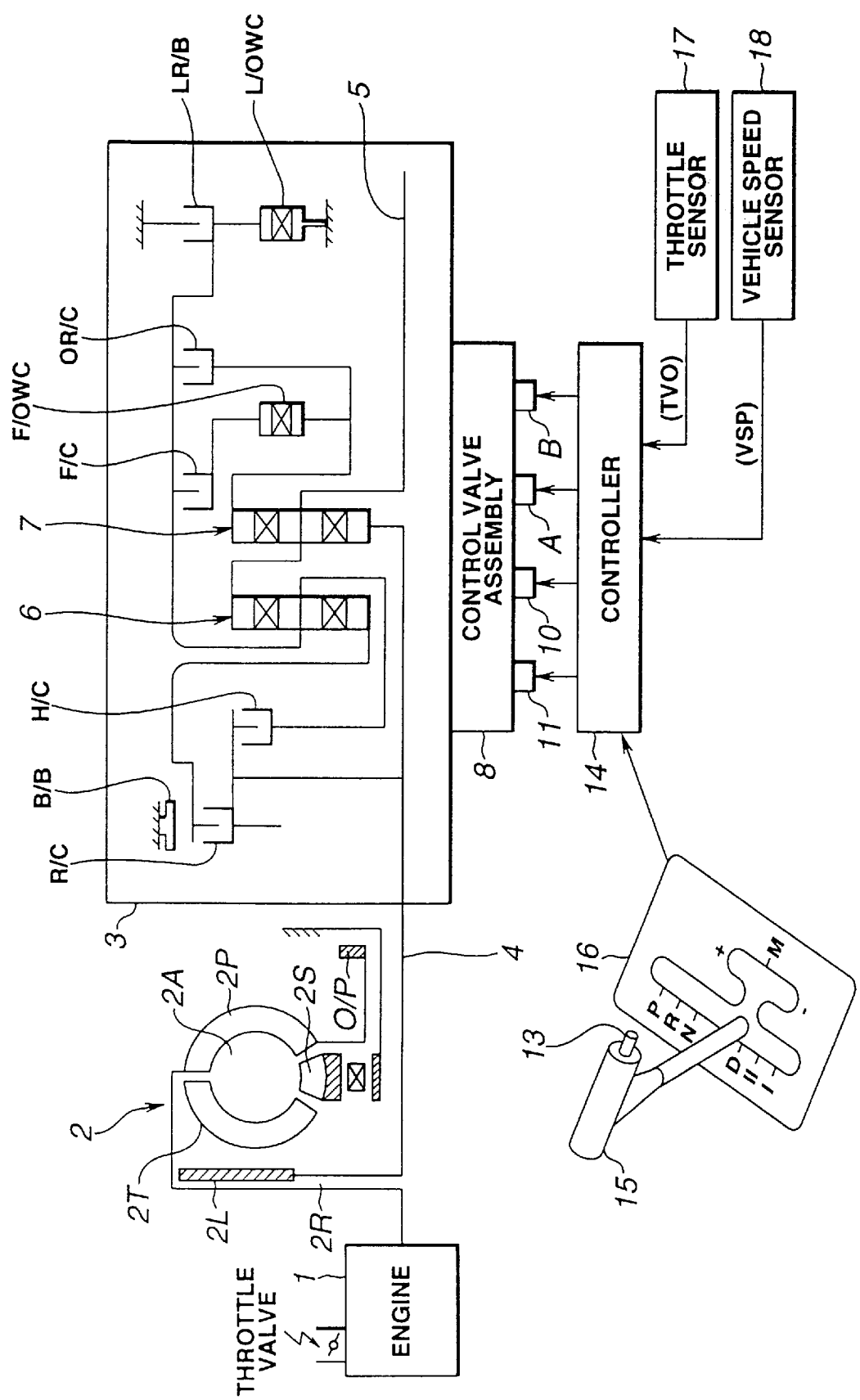

FIG.2(a)

|          | A   | B   |
|----------|-----|-----|
| 1st. RATIO | ON  | ON  |
| 2nd. RATIO | OFF | ON  |
| 3rd. RATIO | OFF | OFF |
| 4th. RATIO | ON  | OFF |

FIG.2(b)

|          | CLUTCH/BRAKE |     |     |     |     |     |     |     |
|----------|-----|-----|-----|-----|-----|-----|-----|-----|
|          | F/C | H/C | B/B | LR/B | OR/C | L/OWC | F/OWC | R/C |
| 1st. RATIO | ○ | × | × | (○) | (○) | ○ | ○ | × |
| 2nd. RATIO | ○ | × | ○ | × | (○) | × | ○ | × |
| 3rd. RATIO | ○ | ○ | × | × | (○) | × | ○ | × |
| 4th. RATIO | × | ○ | ○ | × | × | × | × | × |
| REV. | × | × | × | ○ | × | × | × | ○ |

TORQUE CONVERTER LOCK-UP CONTROL FOR AUTOMATIC TRANSMISSION HAVING MANUAL MODE

FIELD OF THE INVENTION

The present invention relates to a vehicle drive train including a torque converter lock-up clutch situated between an engine and an automatic transmission that is operable in a manual ratio change mode. More particularly, the present invention relates to a technique to engage the lock-up clutch in a manner to enable the automatic transmission to behave like a manual transmission.

BACKGROUND OF THE INVENTION

U.S. Pat. No. 4,680,992 issued Jul. 21, 1987 to Hayasaki et al. and JP-A 62-159839 laid open on Jul. 15, 1987 disclose a vehicle drive train owned by the assignee of the present application. This known vehicle drive train includes a torque converter lock-up clutch situated between an engine with a throttle valve that opens in degrees and an input shaft of an automatic transmission. The lock-up clutch is engaged to connect a turbine runner and a pump impeller to each other. Release of engagement of the lock-up clutch enables hydraulic drive between the pump impeller and the turbine runner for torque multiplication and shock reduction upon ratio change in the automatic transmission. If an operator selects a Drive ("D") range position through a selector lever, the automatic transmission operates in automatic ratio change mode. In the automatic ratio change mode, a desired ratio is determined based on vehicle speed and engine load and established by a ratio change actuator in the form of shift solenoids associated with shift valves. The shift valves guide hydraulic fluid under pressure to appropriate one or ones of torque transmitting units, such as friction clutches and brakes, to establish the desired ratio. For saving fuel consumption, a control system engages the lock-up clutch when torque multiplication is not needed in the automatic ratio change mode.

JP-A 8-210492 discloses a control system for a vehicle engine and automatic transmission drive train. This known control system controls engagement of a torque converter lock-up clutch along with a ratio control for improved fuel economy during operation of an automatic transmission in manual ratio change mode. The prior art control systems are fairly well developed. However, a need remains for further development of such control systems, especially in current movement to increasing user satisfaction.

SUMMARY OF THE INVENTION

As far as known to the inventor, user satisfaction is increased if an operator can feel as if operating a manual transmission after conditioning an automatic transmission in a manual ratio change mode. No control system is known to the inventor, which controls engagement of a torque converter lock-up clutch in such a manner as to meet the above-mentioned operator demand at a satisfactorily high level. An object of the present invention is to provide a torque converter lock-up clutch controlling system, which controls a torque converter lock-up clutch to enable the automatic transmission to behave like a manual transmission so that the operator can feel as if operating the manual transmission.

Among various approaches to this task, the inventor has recognized the importance of maintaining engagement of a torque converter lock-up clutch regardless of the magnitude of the engine load.

Accordingly, it is proposed as one aspect of the present invention to provide a torque converter lock-up clutch controlling system for a vehicle drive train having an engine, a torque converter with a lock-up clutch and an automatic transmission that includes a plurality of gear ratios and is operable in a manual ratio change mode, the controlling system comprising:

a sensor sensing a first operating parameter indicative of vehicle speed and producing a vehicle speed signal;

a sensor sensing a second operating parameter indicative of the magnitude of engine load and producing an engine load signal;

a memory including a lock-up shift point map for storing data which relates the lock-up application and release to the vehicle speed and engine load signals, said lock-up shift point map including lock-up application values which correspond to the magnitudes of the vehicle speed signal at which lock-up clutch applications are to occur, the magnitudes of the vehicle speed signal at which lock-up clutch applications are to occur being determined in a manner as a function of the magnitudes of the engine load signal, said lock-up shift point map including a lock-up release value which corresponds to the magnitude of the vehicle speed signal at which lock-up clutch releases are to occur regardless of the magnitudes of the engine load signal;

a controller receiving the vehicle speed and engine load signals, retrieving data from said lock-up shift point map when the automatic transmission is to operate in the manual ratio change mode, and processing the retrieved data to produce a lock-up signal; and a lock-up actuator for controlling the toque converter lock-up clutch in response to the lock-up signal.

BRIEF DESCRIPTION OF THE DRAWINGS

FIG. 1 is a schematic illustration of the preferred implementation of the present invention.

FIG. 2(a) is a table illustrating the relationship between two shift solenoids and the four forward gear ratios.

FIG. 2(b) is a table illustrating the relationship between torque transmitting units (clutch/brake) and the four forward gear ratios and one reverse ratio.

DESCRIPTION OF THE PREFERRED EMBODIMENTS

Figure 3:
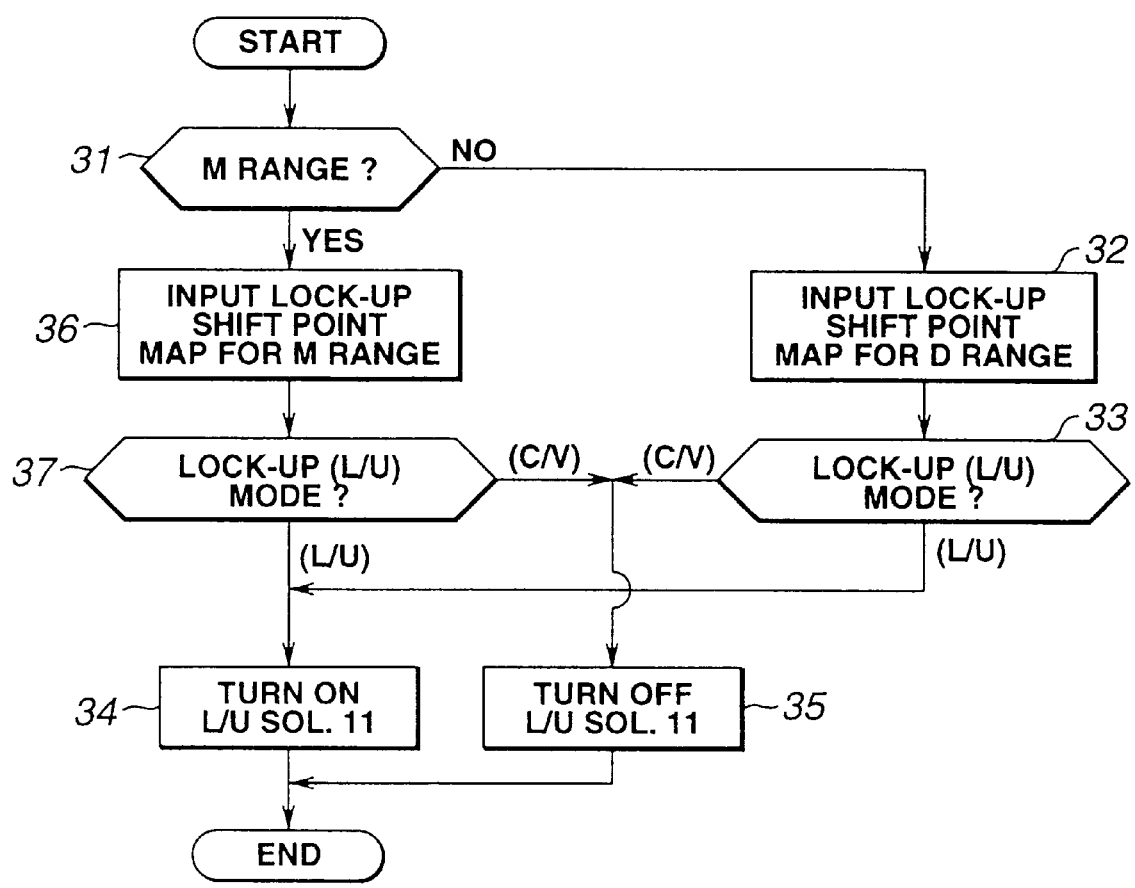
FIG. 3 is a flow chart of a control routine implementing the present invention.

FIG. 1 illustrates an automobile drive train including an engine 1 with a throttle valve which opens in degrees as an operator depress a gas or an accelerator pedal. A torque converter 2 has an input element in the form of a pump impeller 2P, an output element in the form of a turbine runner 2T and a stator 2S. The pump impeller 2P is connected to an output shaft of the engine 1 to be driven thereby. An oil pump O/P is connected to the pump impeller 2P to be driven thereby. The turbine runner 2T is connected to an input shaft 4 of an automatic transmission 3. Oil is disposed between the pump impeller 2P and the turbine runner 2T to provide a hydraulic drive between them. This hydraulic drive provides a slip between the pump impeller 2P and the turbine runner 2T.

A torque converter lock-up clutch 2L is situated between the engine output shaft and the input shaft 4. In this example, the lock-up clutch 2L forms a part of the torque converter 2. When the lock-up clutch 2L is engaged, the torque converter 2 locks up, providing mechanical drive without any slip. The lock-up clutch 2L defines on one side a lock-up release chamber 2R and on the opposite side a lock-up application chamber 2A. When oil is discharged from the lock-up release chamber 2R, the lock-up clutch 2L is engaged. In response to pressure build-up within the lock-up release chamber 2R, the lock-up clutch 2L is disengaged toward its release position.

The automatic transmission 3 provides four forward gear ratios and one reverse gear ratio between the input shaft 4 and an output shaft 5. The drive train including the engine 1, torque converter 2 and the automatic transmission 3 is described in JP-A 62-159839 and U.S. Pat. No. 4,680,992 (issued Jul. 21, 1987 to Hayasaki et al.) that has been incorporated by reference in its entirety.

Briefly explaining, two planetary gear sets, namely a front planetary gear set 6 and a rear planetary gear set 7, are situated between the input and output shafts 4 and 5.

Torque transmitting friction units include a forward clutch F/C, a high clutch H/C, a band brake B/B, a low one-way clutch L/OWC, a forward one-way clutch F/OWC and a reverse clutch R/C. For effective engine braking, a low reverse brake LR/B is arranged in parallel with respect to the low one-way clutch L/OWC and an overrunning clutch OR/C is arranged in parallel with respect to the forward one-way clutch F/OWC.

The table in FIG. 2(b) shows which one or ones of the torque transmitting units should be engaged for each of gear ratios. In this table, the circle ○ indicates engagement and the cross x indicates release. Each of the bracketed circle (○) below the low reverse brake LR/B and the overrunning clutch OR/C indicates engagement required for effective engine braking. Upon demand for engine braking through manipulation of an overdrive (OD) inhibitor switch 13, the overrunning clutch OR/C is engaged for the third gear ratio. Upon demand for engine braking through selection of a II or I range position by a shift lever 15, the overrunning clutch OR/C is engaged for the second gear ratio and the low reverse brake LR/B is also engaged for the first gear ratio.

The automatic transmission provides a gear train for the fourth gear ratio. This gear train provides effective engine braking, requiring no additional overrunning clutch for effective engine braking.

For distribution of oil under line pressure, the control valve assembly 8 includes a shift solenoid A, a shift solenoid B and an overrunning clutch solenoid 10. The control valve assembly 8 also includes a lock-up solenoid 11 for controlling the lock-up clutch 2L. The detailed description of the control valve assembly 8 with the solenoids A, B, 10 and 11 may be found in description from column 5 line 49 to column 29 line 11 of the incorporated U.S. Pat. No. 4,680, 992. In this description, shift solenoids 42 and 44 corresponds to the shift solenoids A and B, a solenoid 34 corresponds to the lock-up solenoid 11, and a solenoid 60 corresponds to the overrunning clutch solenoid 10.

The table in FIG. 2(a) illustrates which one or ones of shift solenoids A and B should be energized for each of the four forward gear ratios. In the table, the symbol "ON" indicates energized state, and the symbol "OFF" indicates de-energized state.

When the lock-up solenoid 11 is in the state of "ON", the lock-up clutch 2L is engaged, causing occurrence of a lock-up application in the torque converter 2. When the lock-up solenoid 11 is in the state of "OFF", the lock-up clutch 2L is released, causing occurrence of a lock-up release in the torque converter 2. The lock-up solenoid 11 is operative to take "ON" in response to the presence of a lock-up signal or "OFF" in response to the absence of the lock-up signal The solenoids A, B, 10 and 11 are under the control of a controller 14. The controller 14 is connected to the OD inhibitor switch 13, a selector switch 16, a throttle sensor 17 and a vehicle speed sensor 18.

The sensor 18 senses, as a first operating parameter indicative of vehicle speed, a speed of the transmission output shaft 5 and produces a vehicle speed signal VSP. The sensor 17 senses, as a second operating parameter indicative of the magnitude of engine load, an opening degree of the throttle valve of the engine 1 and produces an engine load signal TVO. The OD inhibitor switch 13 indicates operator engine braking demand for the third gear ratio.

With regard to the shift lever 15 associated with the selector switch 16, the shift lever 15 may be manually moved to select any one of operator's desired positions "P" (Park), "R" (Reverse), "N" (Neutral), "D" (Drive), "II" and "I". The shift lever 15 may be moved to a "M" (Manual) range position. The selector switch 16 senses which one of the positions the shift lever 15 has selected and produces a selected position signal. The selector switch 16 produces an engine brake demand signal when the OD inhibitor switch 13 indicates operator engine braking demand for the third gear ratio.

The vehicle speed signal VSP, engine load signal TVO, selected position signal and engine braking demand signal are fed to the controller 14.

After selection of the "M" range position, the shift lever 15 is spring biased toward a position away from a manual upshift position "+" and a manual downshift position "−". When the operator wishes an upshift from the current gear ratio to the next adjacent gear ratio, what one has to do is to move the shift lever 15 to the upshift position "+". When the operator wishes a downshift from the current gear ratio to the next adjacent gear ratio, one has to move the shift lever 15 to the downshift position "−".

The selector switch 16 produces an up-signal upon selection of the upshift position "+" and a down-signal upon selection of the downshift position "−". The up-signal or down-signal is fed to the controller 14.

In response to selection of the "M" range position, the controller 14 conditions the overrunning clutch solenoid 10 to one of "ON" or "OFF" state to cause engagement of the overrunning clutch OR/C for each of the first to third gear ratios. The engagement of the overrunning clutch OR/C is released for the fourth gear ratio by conditioning the overrunning clutch solenoid 10 to the other state. When the "M" range position is selected, a manual valve in the control valve assembly 8 is held in its "D" range position. Thus, the low reverse brake LR/B is kept released for the first gear ratio in the "M" range position. This is different from the first gear ratio in "I" range position. For the first gear ratio, the manual valve distributes oil under line pressure to the low reverse brake LR/B, Thus, the low reverse brake LR/B is engaged in addition to the overrunning clutch OR/C.

Figure 5:
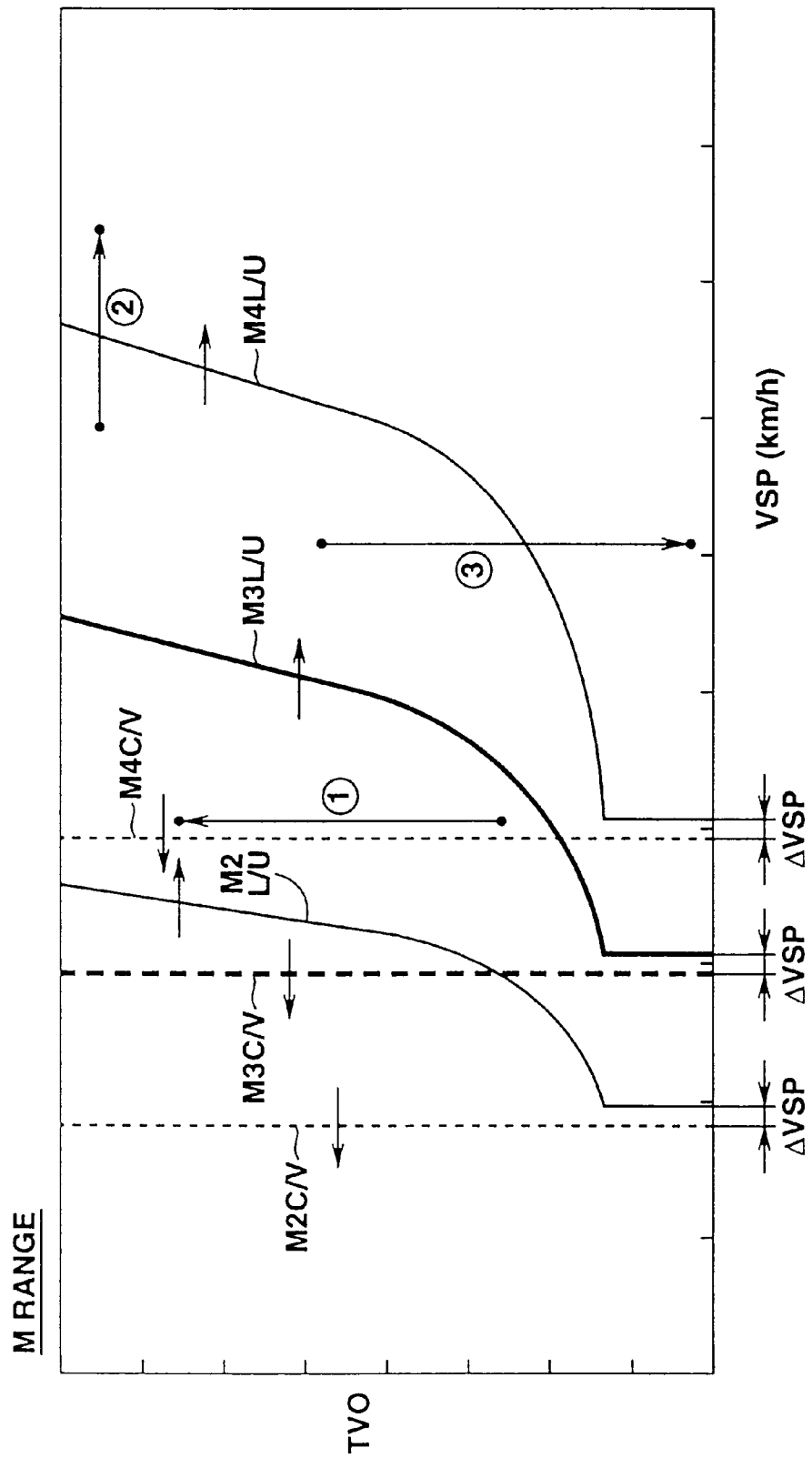
FIG. 5 illustrates a lock-up shift point map for manual (M) range.

For operation in the "M" range position, the controller 14 controls the lock-up solenoid 11 in accordance with the lock-up shift point map as illustrated in FIG. 5.

Automatic shift in gear ratio upon selection of the "D" range position is briefly explained. The controller 14 controls the shift solenoids A and B to accomplish a desired gear ratio that has been given after retrieving data from a shift point map for "D" range in FIG. 4 using the vehicle speed signal VSP and engine load signal TVO.

In response to the engine braking demand signal from the OD inhibitor switch 13, the controller 14 prohibits an upshift to the fourth gear ratio and engages the overrunning clutch OR/C through the solenoid 10 to effect engine braking for the third gear ratio.

When the operator selects the "II" range position through the selector lever 15, the controller 14 prohibits upshift to the third gear ratio and engages the overrunning clutch OR/C through the solenoid 10 to effect engine braking for the second gear ratio.

When the operator selects the "I" range position through the selector lever 15, the controller 14 prohibits upshift to the second gear ratio and engages the overrunning clutch OR/C through the solenoid 10. At the same time, oil under line pressure is supplied to the low reverse brake LR/B from the manual valve that has been set to the "I" range position. Thus, engine braking is effected for the first gear ratio.

Figure 4:
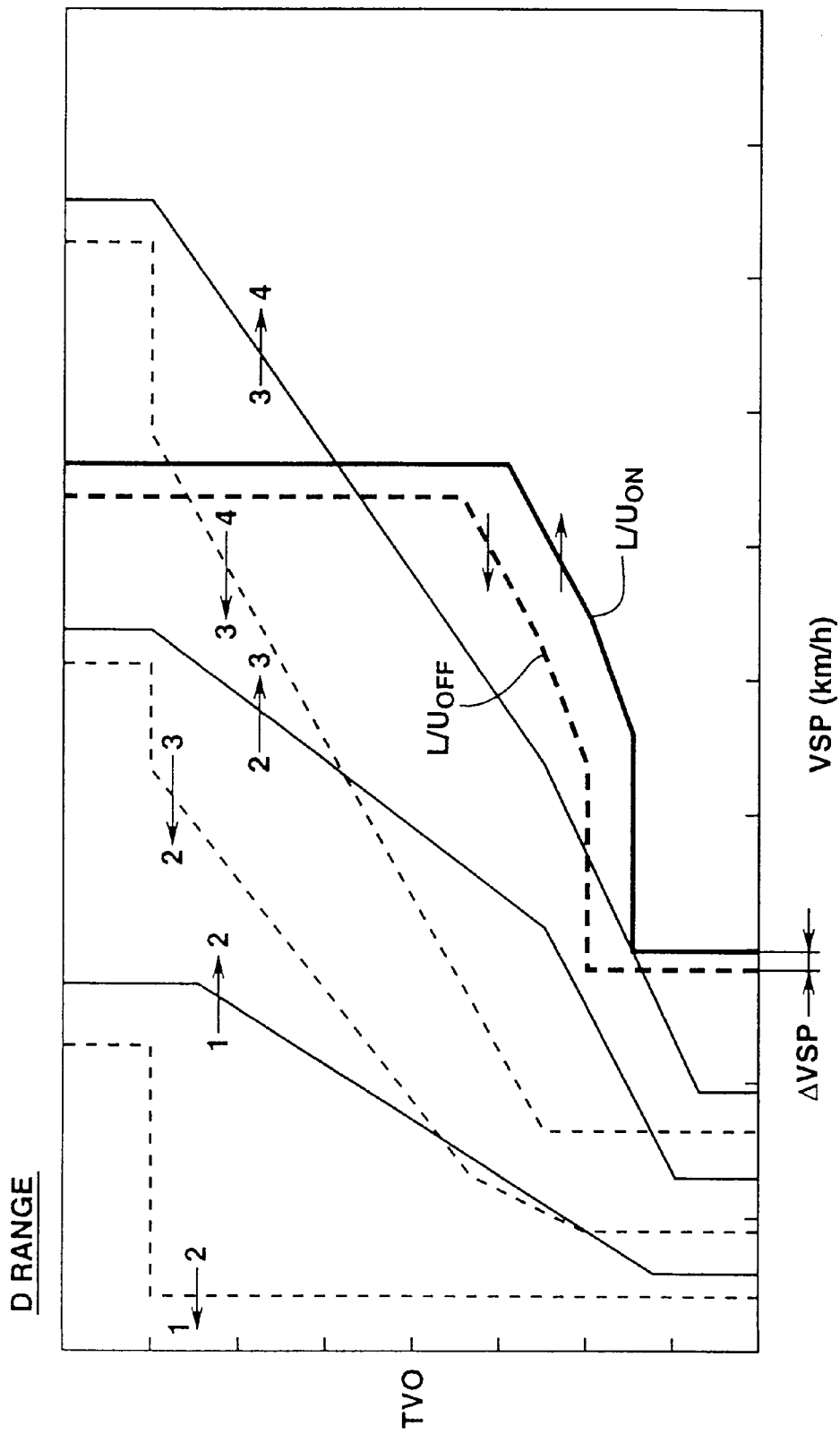
FIG. 4 illustrates a lock-up shift point map for drive (D) range with a gear ratio shift point map.

With regard to lock-up for the "D" range, the controller 14 retrieves data from a lock-up shift point map in FIG. 4 and processes the retrieved data to produce the lock-up signal. The controller 14 conditions the lock-up solenoid in "ON" or "OFF" state in response to the presence or absence of the lock-up signal.

The lock-up control for the "M" range is hereinafter explained.

The flow chart of FIG. 3 illustrates a control routine of the preferred implementation of the present invention.

In step 31, the controller 14 determines whether or not the manual (M) range is selected to condition the automatic transmission for operation in a manual ratio change mode.

If, in step 31, the "M" range is not selected, the routine proceeds to step 32. In step 32, the controller 14 inputs a lock-up shift point map for drive (D) range. A memory device of the controller 14 stores the lock-up shift point map for "D" range as illustrated in FIG. 4 and a lock-up shift point map for "M" range as illustrated in FIG. 5. The lock-up shift point map stores data, which relates the lock-up, apply and release to the vehicle speed and the engine load signals. The lock-up shift point map for "D" range includes lock-up application values $L/U_{ON}$ for each of three gear ratios which correspond to the magnitudes of a first parameter, preferably a transmission output shaft speed, indicative of vehicle speed VSP at which the lock-up clutch applications are to occur. The magnitudes of the vehicle speed VSP at which lock-up clutch applications are to occur are determined in a manner as a function of the magnitudes of the engine load signal TVO indicated by a second parameter, preferably, the engine throttle opening degree. The lock-up shift point map for "D" range also includes lock-up release values $L/U_{OFF}$ for each of the three gear ratios which corresponds to the magnitudes of the vehicle speed VSP at which the lock-up releases are to occur.

After step 32, the routine proceeds to step 33. In step 33, the controller 14 retrieves data from the lock-up shift point map for "D" range based on current gear ratio, the vehicle speed signal VSP and the engine load signal TVO, processes the retrieved data to produce a lock-up signal. In plain words, in response to the absence of a lock-up signal, an appropriate one of the lock-up application values for the current gear ratio to the current engine load signal is retrieved, and compared with the current vehicle speed signal. If the current vehicle speed signal is higher than the appropriate one lock-up application value, the controller 14 produces a lock-up signal. If not, the controller 14 does not produce the lock-up signal In response to the presence of a lock-up signal, an appropriate one of the lock-up release values for the current gear ratio to the current engine load signal is retrieved, and compared with the current vehicle speed signal If the current vehicle speed signal is higher than the appropriate one lock-up release value, the controller 14 produces the lock-up signal. If not, the controller 14 does not produce the lock-up signal. The presence of the lock-up signal indicates that the torque converter 2 should operate in a lock-up (L/U) mode, while the absence of the lock-up signal indicates that the torque converter 2 should operate in a converter (C/V) mode.

If, in step 33, the interrogation result instructs that the torque converter 2 should operate in the L/U mode, the routine proceeds to step 34. If, in step 33, the interrogation result instructs that the torque converter 2 should operate in the C/V mode, the routine proceeds to step 35. In step 34, the controller 14 gives instructions that the lock-up actuator in the form of the lock-up solenoid 11 is turned to "ON" state in response to the presence of the lock-up signal. In step 35, the controller 14 gives instructions that the lock-up actuator in the form of the lock-up solenoid 11 is turned to "OFF" state in response to the absence of the lock-up signal.

If, in step 31, it is determined that the "M" range is selected, the routine proceeds to step 36. In step 36, the controller 14 inputs the lock-up shift point map for manual (M) range. The lock-up shift point map for "M" range stores data, which relates the lock-up application and release to the vehicle speed and the engine load signals. Referring to FIG. 5, the lock-up shift point map for "M" range includes lock-up application values M2L/U for the second (2) gear ratio which correspond to the magnitudes of the first parameter indicative of vehicle speed VSP at which the lock-up clutch applications are to occur. The lock-up shift point map for "M" range also includes a lock-up release value M2C/V for the second gear ratio which corresponds to the magnitude of the vehicle speed signal VSP at which the lock-up releases are to occur. The lock-up shift point map for "M" range includes lock-up application values M3L/U for the third (3) gear ratio which correspond to the magnitudes of the first parameter indicative of vehicle speed VSP at which the lock-up clutch applications are to occur. The lock-up shift point map for "M" range also includes a lock-up release value M3C/V for the third gear ratio which corresponds to the magnitude of the vehicle speed signal VSP at which the lock-up releases are to occur. The lock-up shift point map for "M" range includes lock-up application values M4L/U for the fourth (4) gear ratio which correspond to the magnitudes of the first parameter indicative of vehicle speed VSP at which the lock-up clutch applications are to occur. The lock-up shift point map for "M" range also includes a lock-up release value M4C/V for the fourth gear ratio which corresponds to the magnitude of the vehicle speed signal VSP at which the lock-up releases are to occur.

Plotting of the lock-up application values M2L/U, M3L/U and M4L/U for the second, third and fourth gear ratios are illustrated in FIG. 5 by the fully drawn lines often called lock-up application lines. Plotting of the lock-up release values M2C/V, M3C/V and M4C/V for the second, third and fourth gear ratios are illustrated in FIG. 5 by broken lines often called lock-up release lines. Viewing in FIG. 5, a converter range for each of the three gear ratios is on the left-hand side of the lock-up release line for the gear ratio.

Each of the lock-up application lines defines on its right hand side a lock-up range.

The lock-up release line for each of the three gear ratios is a vertical straight line illustrating a single lock-up release value which corresponds to a predetermine magnitude of the vehicle speed signal VSP regardless of the magnitudes of the engine load signal TVO. The level of noise and vibration and the level of lock-up clutch capacity drop below acceptable levels if, with the lock-up clutch 2L kept engaged, the vehicle speed drops below a lower limit. Such lower limits exist for the three gear ratios, respectively. The setting is such that the predetermined magnitude of the vehicle speed signal VSP for each of the three gear ratios is higher than the lower limit for the gear ratio and falls in the proximity thereof Referring to FIG. 5, the lock-up application line for each of the three gear ratios includes a vertical line segment extending in parallel to the associated lock-up release line for the gear ratio. The vertical line segment of each of the lock-up application lines shows that a single lock-up application value is always given for varying magnitudes of the engine load signal TVO as long as the magnitude of the engine load signal TVO are small and less than a first predetermined value. This single lock-up application value is higher than the lock-up release value on the associated lock-up release line by a hysteresis amount corresponding to the magnitude of $\Delta$VSP. This relation is analogous to the relation between the lock-up application line $L/U_{ON}$ and the lock-up release line $L/U_{OFF}$ for "D" range as illustrated in FIG. 4. For the magnitudes of the engine load signal TVO which are greater than the first predetermined value, the lock-up application line for each of the three gear ratios is deviated toward high vehicle sides greatly from the associated lock-up release line. Specifically, it is deviated in a manner that the lock-up application value that corresponds to the magnitudes of the vehicle speed signal VSP increases as the magnitude of engine load signal TVO increases. The hysteresis amount is variable with varying magnitudes of the engine load signal TVO.

Figure 6:
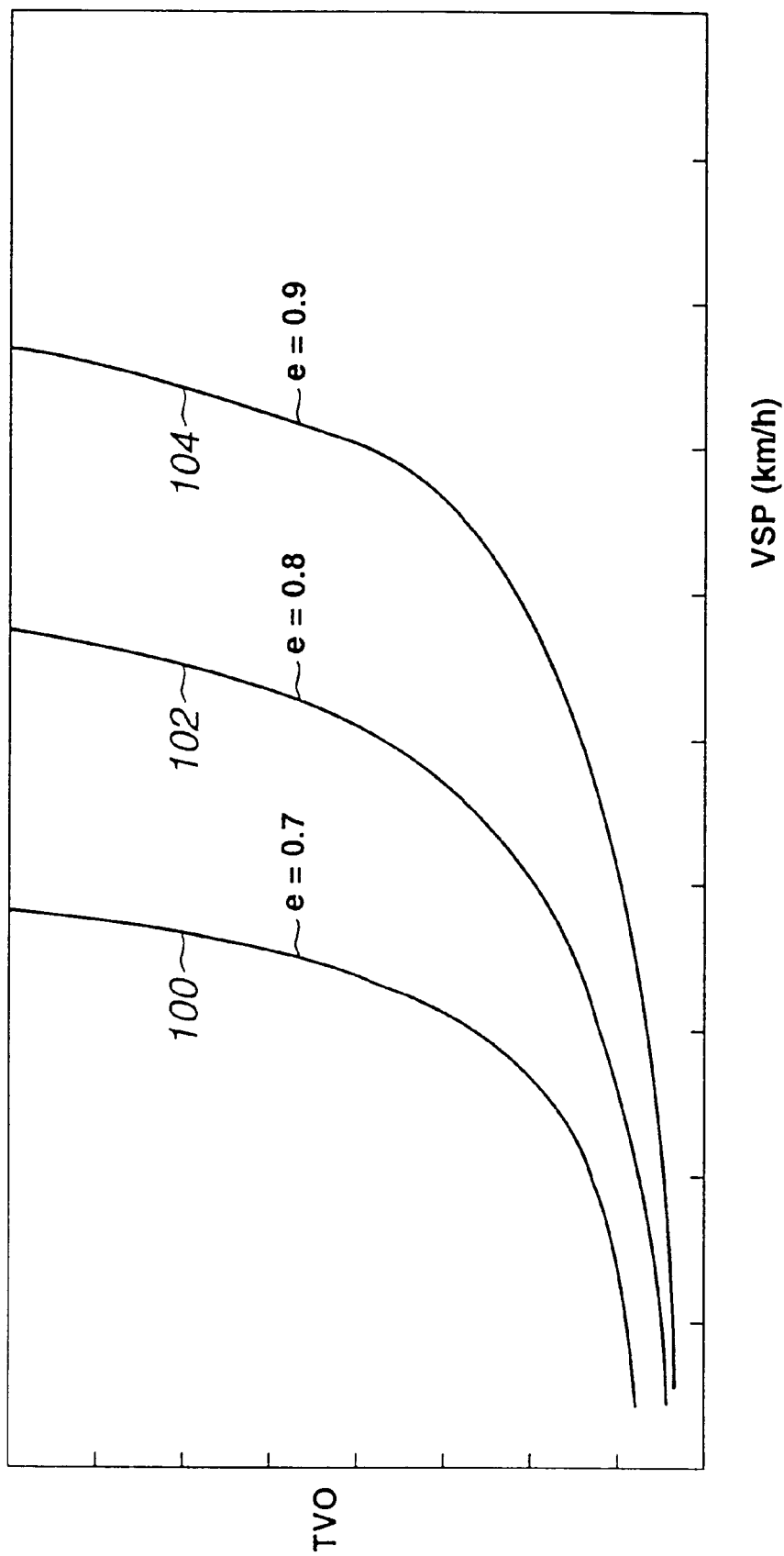
FIG. 6 illustrates a torque converter performance map for a gear ratio.

The torque converter map in FIG. 6 illustrates three operating lines 100, 102 and 104 for a certain one of the three gear ratios. The torque converter 2 in the vehicle drive train is operated along the operating line 100 with a speed ratio e=0.7. The speed ratio e is a ratio of the speed No of the output element of the torque converter 2 to the speed Ni of the input element thereof (e=No/Ni). The torque converter 2 is operated along the operating line 102 with the speed ratio e=0.8. The torque converter 2 is operated along the operating line 104 with the speed ratio e=0.9. As is well known, such operating lines for each of the other two gear ratios are different one after another.

Over varying magnitudes of the engine load signal TVO which are greater than the predetermined value, the lock-up application values for each of the three gear ratios correspond to the magnitudes of the vehicle speed signal at which the torque converter 2 slips at the speed ratio e=0.9. In plain words, the lock-up application line for each of the three gear ratios follows the curvature of the torque converter operating line that provides the speed ratio e=0.9 over varying magnitude of the engine load signal TVO which are greater than the predetermined value.

Turning back to the flow chart of FIG. 3, after step 36, the routine proceeds to step 37. In step 37, the controller 14 retrieves data from the lock-up shift point map for "M" range is based on current gear ratio, the vehicle speed signal VSP and the engine load signal TVO, processes the retrieved data to produce a lock-up signal. In plain words, in response to the absence of a lock-up signal, an appropriate one of the lock-up application values for the current gear ratio to the current engine load signal is retrieved, and compared with the current vehicle speed signal. If the current vehicle speed signal is higher than the appropriate one lock-up application value, the controller 14 produces a lock-up signal If not, the controller 14 does not produce the lock-up signal. In response to the presence of a lock-up signal, an appropriate one of the lock-up release values for the current gear ratio to the current engine load signal is retrieved, and compared with the current vehicle speed signal. If the current vehicle speed signal is higher than the appropriate one lock-up release value, the controller 14 produces the lock-up signal. If not, the controller 14 does not produce the lock-up signal. The presence of the lock-up signal indicates that the torque converter 2 should operate in a lock-up (L/U) mode, while the absence of the lock-up signal indicates that the torque converter 2 should operate in a converter (C/V) mode.

If, in step 37, the interrogation result instructs that the torque converter 2 should operate in the L/U mode, the routine proceeds to step 34. If, in step 33, the interrogation result instructs that the torque converter 2 should operate in the C/V mode, the routine proceeds to step 35. In step 34, the controller 14 gives instructions that the lock-up actuator in the form of the lock-up solenoid 11 is turned to "ON" state in response to the presence of the lock-up signal. In step 35, the controller 14 gives instructions that the lock-up actuator in the form of the lock-up solenoid 11 is turned to "OFF" state in response to the absence of the lock-up signal.

The lock-up shift point map for "M" range (see FIG. 5) includes a single lock-up release value for each of the three gear ratios over varying magnitudes of the engine load signal TVO. This single lock-up release value corresponds to a magnitude of the vehicle speed signal at which the lock-up releases are to occur against the varying magnitudes of the engine load signal.

The setting is such that the predetermined magnitude of the vehicle speed signal VSP for each of the three gear ratios is higher than a lower limit for the gear ratio and falls in the proximity thereof. If, with the lock-up clutch engaged, the vehicle speed signal drops below this lower limit, the level of noise and vibration and the level of lock-up clutch capacity drop below acceptable levels.

The lock-up mode after the torque converter has locked up has extended fully in such a direction as to decrease the vehicle speed signal. This enables the automatic transmission to give such an impression to the operator that one operating a manual transmission. This can be confirmed by inspecting a shift from along an arrow ① between two operating points (see FIG. 5) after occurrence of lock-up application with the fourth gear ratio. The torque converter stays in lock-up mode after the operator has depressed the gas pedal to increase the magnitude of the engine load to effect this shift.

The lock-up application line for each of the three gear ratios is deviated in a manner that the lock-up application value that corresponds to the magnitudes of the vehicle speed signal VSP increases as the magnitude of the engine load signal TVO increases.

Let us inspect a shift in a direction along an arrow ② between two operating points at high vehicle speeds with large engine load. The two operating points, as viewed in FIG. 5, are located on one and the opposite sides of the lock-up application line M4L/U for the fourth gear ratio in "M" range. The lock-up application value at which lock-up application occurs during this shift corresponds to the magnitude of the vehicle speed signal at which the torque converter operates with a small slip. Thus, the magnitude of shocks inherent with the occurrence of lock-up application is suppressed and small.

The lock-up application values during operation with small magnitude of the engine load signal correspond to the small magnitudes of the vehicle speed signal. Thus, viewing in FIG. 5, a reduction in area of the lock-up mode during operation with large magnitudes of the engine load is compensated for to some degrees by an increase in area of the lock-up mode during operation with small magnitudes of the engine load. This enables the automatic transmission to behave like a manual transmission to meet operator demand that is generated upon operator selection of "M" range. Thus, the operator may feel as if one were operating the manual transmission after selecting the "M" range.

Referring to FIG. 5, let us consider a shift in a direction along an arrow ③ between two operating points during operation with the fourth gear ratio in the "M" mode. Among the two operating points, the initial operating point is located where the torque converter 2 is in its converter state. This shift clearly shows that the lock-up application occurs immediately after a reduction in the engine load without requiring an increase in vehicle speed. This is also advantageous in enabling the automatic transmission to behave like a manual transmission, causing the operator to feel as if one were operating the manual transmission.

According to the preferred implementation, the lock-up application values correspond to the magnitudes of the vehicle speed signal at which the torque converter has a small slip corresponding to the speed ratio e=0.9. Thus, the magnitude of shock upon lock-up application is suppressed to a satisfactorily low level whenever occurs such lock-up application.

The appropriate lock-up application values and lock-up release values are set for each of the three gear ratios. Thus, the optimum lock-up applications for each gear ratio result.

The content of disclosure of Japanese Patent Application No. 10-97321 (filed Apr. 9, 1998) is hereby incorporated by reference in its entirety.

The above-described implementation of the present invention is an example implementation. Moreover various modifications to the present invention may occur to those skilled in the art and will fall within the scope of the present invention as set forth below.

What is claimed is:

1. A torque converter lock-up clutch controlling system for a vehicle drive train having an engine, a torque converter with a lock-up clutch and an automatic transmission that includes a plurality of gear ratios and is operable in a manual ratio change mode, the controlling system comprising:

a sensor sending a first operating parameter indicative of vehicle speed and producing a vehicle speed signal;

a sensor sensing a second operating parameter indicative of the magnitude of engine load and producing an engine load signal;

a memory including a lock-up shift point map for storing data which relates the lock-up application and release to the vehicle speed and engine load signals, said lock-up shift point map including lock-up application values which correspond to the magnitudes of the vehicle speed signal at which lock-up clutch applications are to occur, the magnitudes of the vehicle speed signal at which lock-up clutch applications are to occur being determined in a manner as a function of the magnitudes of the engine load signal, said lock-up application values correspond to the magnitude of the vehicle speed signal at which a speed ratio in the torque converter stays at a predetermined value over varying magnitudes of the engine load signal, said lock-up shift point map including a lock-up release value which corresponds to the magnitude of the vehicle speed signal at which lock-up clutch releases are to occur regardless of the magnitudes of the engine load signal;

a controller receiving the vehicle speed and engine load signals, retrieving data from said lock-up shift point map when the automatic transmission is to operate in the manual ratio change mode, and processing the retrieved data to produce a lock-up signal; and a lock-up actuator for controlling the torque converter lock-up clutch in response to the lock-up signal.

2. The torque converter lock-up clutch controlling system as claimed in claim 1, wherein said lock-up application values increase as the magnitudes of the engine load signal increase.

3. The torque converter lock-up clutch controlling system as claimed in claim 1, wherein the magnitude of the vehicle speed signal which said lock-up release value corresponds to is greater than and falls in the proximity of a lower limit in the vehicle speed below which probability of occurrence of noise and vibration and of unsatisfactory lock-up clutch capacity pose a problem.

4. The torque converter lock-up clutch controlling system as claimed in claim 1, wherein said lock-up application values are provided for each of at least two gear ratios, said lock-up release value is provided for each of at least two gear ratios.

* * * * *